April 15, 1941.　　A. P. D. BELANGER　　2,238,304
CUTTING TOOL
Filed Oct. 12, 1938　　2 Sheets-Sheet 1
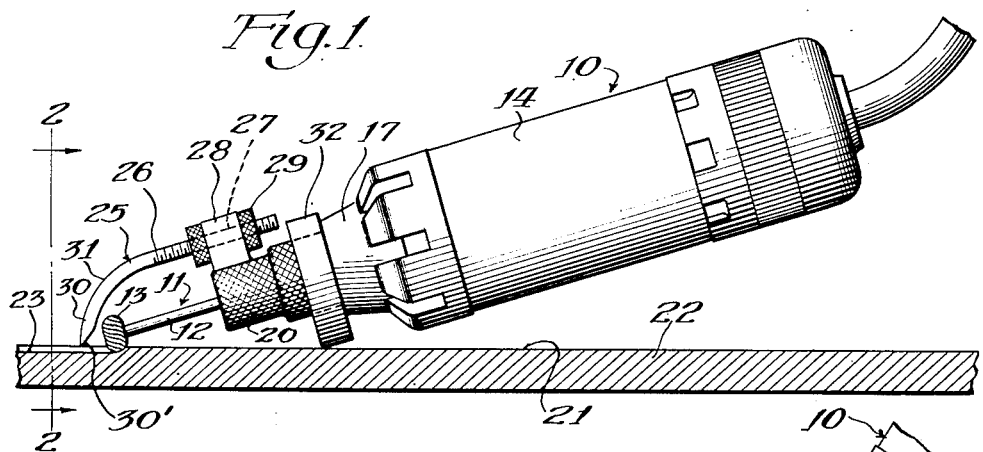
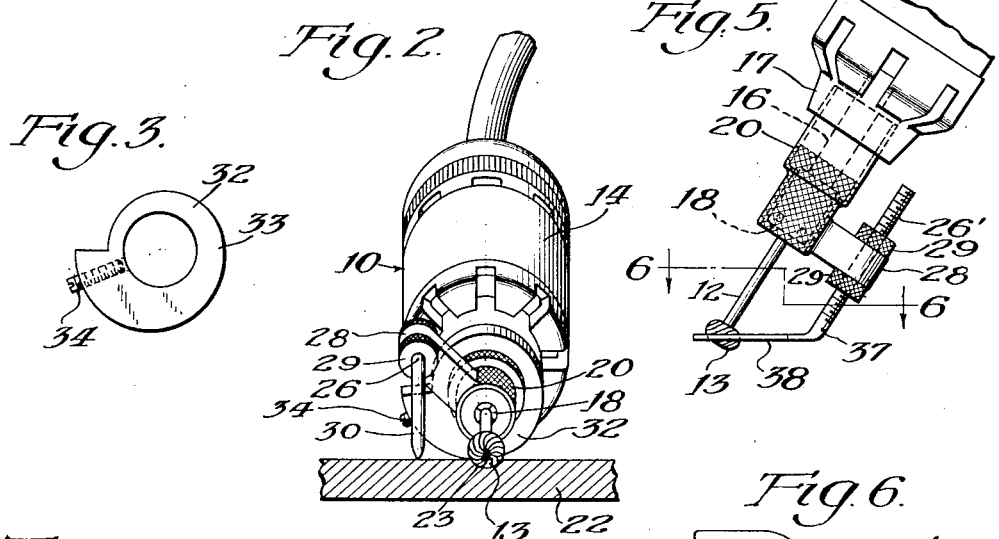
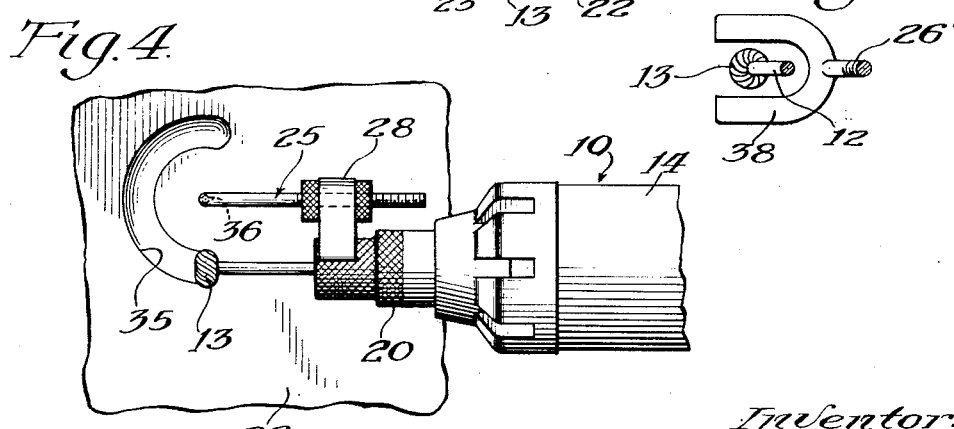
Inventor:
Albert P. D. Belanger,
By Belt, Wallace & Cannon
Attorneys.

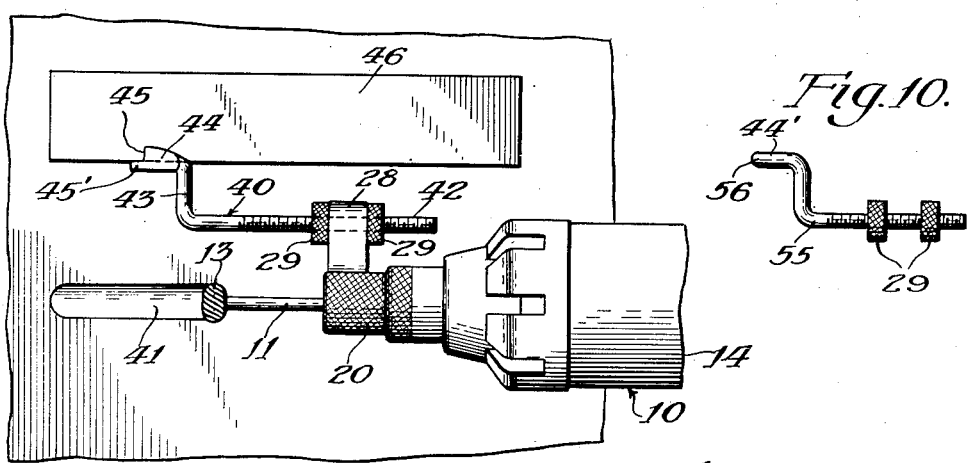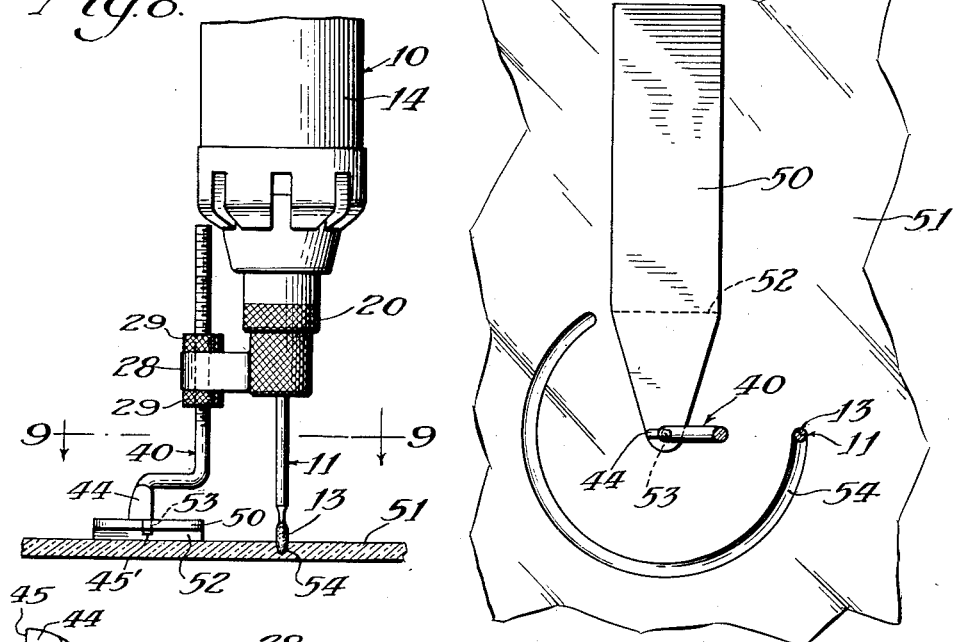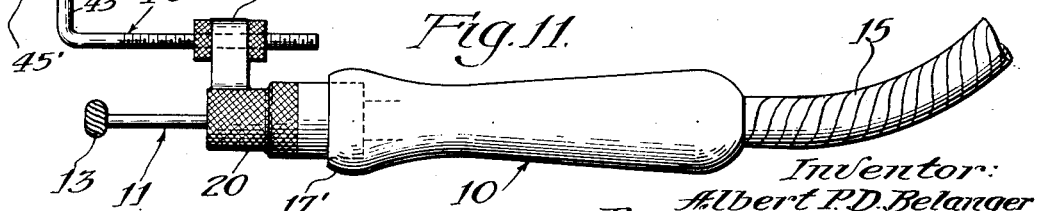

Patented Apr. 15, 1941

2,238,304

UNITED STATES PATENT OFFICE 2,238,304

CUTTING TOOL

Albert P. D. Belanger, Chicago, Ill., assignor to Chicago Wheel & Manufacturing Company, Chicago, Ill., a corporation of Illinois Application October 12, 1938, Serial No. 234,735

8 Claims. (Cl. 144—136)

This invention relates generally to cutting tools and more particularly to relatively small tools adapted to be manually guided over the surface of a work piece while cutting or grinding a groove in such surface.

The primary object of the present invention is to simplify the use of tools of this character through the provision of means for steadying and guiding the tool.

Another object is to provide a tool of this character having a new and improved guiding means for the tool whereby the tool may be readily adapted for the performance of many different types of cutting operations.

Another object is to provide a tool having guiding means which is readily adaptable to the several types of cutting elements normally employed in cutting tools of this character.

The further object is to provide guiding means for a manual cutting tool whereby the tool may be readily guided in the production of straight line cuts, curved cuts or circular cuts.

Another object is to provide a tool of this character having simple and effective means for regulating the depth of the cut to be made thereby.

Other objects and advantages will become apparent from the following description, taken in connection with the accompanying drawings in which Fig. 1 is a side elevational view of a manual cutting tool embodying the features of the invention, the tool being shown in its operative relation to a work piece;

Fig. 2 is a front elevational view of the tool of Fig. 1, the view being taken along the line 2—2 of Fig. 1;

Fig. 3 is an elevational view of one of the guiding elements employed in Figs. 1 and 2;

Fig. 4 is a view illustrating the use of the present tool in the formation of a circular cut.

Fig. 5 is a view illustrating a different form of guiding element;

Fig. 6 is a plan sectional view taken along the line of 6—6 of Fig. 5;

Fig. 7 is a view of the tool illustrating an alternative form of a guiding element adapted particularly for use in producing a straight line cut in a work surface;

Fig. 8 is a view illustrating the tool and guiding element of Fig. 7 as used in producing a circular cut in the surface of a material such as glass, a different form of cutting element being employed in this instance.

Fig. 9 is a plan sectional view taken along the line 9—9 of Fig. 8;

Fig. 10 is an elevational view of an alternative form of guiding element; and

Fig. 11 is a view illustrating the cutting and guiding elements of Fig. 7 as embodied in a tool driven by a flexible shaft as distinguished from the other embodiments wherein the driving motor is mounted directly on the tool;

In the several forms chosen for disclosure herein the invention is embodied in a portable power driven tool having a handle 10 adapted to be grasped by the workman to support and manipulate the tool to engage its cutting or work-performing tool 11 with the surface of a work piece. In each instance the tool 11 has a shank 12 with an operative cutting element 13 at one end, while the other end of the shank 12 is secured in an operative relation to driving means on or within the handle 10. Such driving means may be of any preferred form such as the electric motor 14 which forms a part of the handle 10 in Figs. 1, 2, 4, 5, 7 and 8, or a flexible shaft drive indicated at 15 in Fig. 11. In either event, the driving means terminates in a power output shaft 16 (Fig. 5) which projects from the handle through a relatively large end flange 17 and terminates in a chuck 18 which operates in a conventional manner to clamp the tool shank 12 in axial relation to the output shaft 16.

Portable tools of this character are employed principally for cutting grooves, recesses or the like in the surfaces of a work piece, and the precise character of the operative cutting element 13 is in a large measure determined by the material of the work piece. Thus in Figs. 1, 2, 4, 5, 7 and 8 the cutting element 13 is in the nature of a toothed steel cutter adapted for cutting slots, grooves or recesses in wood or similar materials, while in Fig. 8 the cutting element is formed from abrasive for use with harder or more brittle material such as glass. Other forms of cutting tools could, of course, be used, since such operations all serve to remove material from the work piece, the various types operative elements are herein termed cutting elements or tools.

The performance of such cutting operations must, of course, be performed in such a manner as to avoid damage to the work surface beyond the limits of the desired cut, and in accordance with the present invention the portable tool is so constructed as to facilitate such accurate use of the tool. To this end guiding means is provided to aid the operator in supporting and guiding the tool over the work surface, and in each instance this guiding means aids an operator not only in determining and controlling the direction of improvement of the cutting element but also in determining the depth of the cut. This guiding means of the present invention also serves in some instances to determine the position or angle of the tool, thereby causing the tool to produce a uniformly cut surface.

In providing the guiding means of the present invention I prefer to utilize a guard sleeve 20 which surrounds the chuck 18 and the end of the shaft 16 and projects into the annular recess formed by the flange 17. This guard sleeve 20 is preferably removably related to the handle 10 so as to provide for access to the chuck 18, and in the present instance this removable relationship is attained through the provision of a relatively tight slip fit between the flange 17 and the enclosed end of the guard sleeve 20. In the form shown in Figs. 1, 2 and 3 the guiding means provides for engagement with the surface 21 of a work piece 22 at two points, one of which is located relatively close to the operative cutting element 13 so as to aid in determining the depth of a cut such as a slot 23, while the other point of engagement is located a considerable distance back of the operative cutting element 13 so as to cooperate with the first point of engagement to determine the angle at which the portable tool is related to the work surface. To this end a first guiding element 25 is provided to engage the work surface adjacent to the cutting element 13 and this guiding element 25 is preferably arranged so as to provide for adjustment with relation to the cutting element 13. Such adjustment is in the present instance both longitudinal and lateral with respect to the cutting element 13, and by reason of this more or less universal adjustment the guiding element 25 is adaptable for use in many different types of cutting operations.

In its preferred form the guiding element 25 has a screw threaded mounting portion as shank 26 which projects through an opening 27 in a lug 28 which projects laterally from the guard sleeve 20. The opening or bore 27 constitutes, in effect, a mounting sleeve, and is preferably parallel to the relative axis to the tool shank 12 and is, of course, located laterally with respect to the tool shank. The screw threaded mounting portion 26 of the guiding element 25 has nuts 29 thereon for clamping engagement with opposite faces of the lug 28 so that by adjustment of the nuts 29 the longitudinal position of the guide member 25 may be varied as required. To attain the transverse adjustment of the guiding member 25, said member is provided with a work engaging end 30 formed by curving the member laterally as indicated at 31. Since the work engaging end 30 is eccentric with respect to the mounting portion 26, the lateral relationship of the work engaging end 30 to the tool or cutting element 13 may be varied by clamping the mounting portion 26 in different rotative relationships to the lug 28.

The second point of engagement of the guiding means with the work surface is provided, in the embodiment of Fig. 1, by means of a second guiding member 32 mounted on the guard sleeve 20 adjacent to the flange 17. The member 32 projects laterally from the guard sleeve and rests upon the surface 21 of the work piece, and by reason of such contact cooperates with the guiding element 25 in determining the angle of the tool axis with relation to the work surface. Since the character of the cutting operations may vary widely, the present invention provides for variations of this angle. Such variations or adjustment may, of course, be accomplished in a measure through adjustment of the guiding element 25, but since the element 25 functions in determining the depth of the cut, I utilize the guiding element 32 in attaining this adjustment. To this end the guiding element 32 is constructed as illustrated in Figs. 2 and 3, in the form of a cam-like disc the peripheral edge 33 of which is generally helical in form. Thus by rotating the member 32 about the guard sleeve 20, the effectiveness of the guiding member 32 may be varied. The desired rotative adjustment of the member 32 is maintained by a set screw 34.

While the guiding element 25 may be utilized generally in the various types of cutting operations, it has particular utility in the formation of circular or annular cuts, such as that indicated at 35 in Fig. 4 of the drawings. When such circular or annular cut is to be formed in a material such as wood, a center hole 36 may be formed as by punching to receive the pointed end 30' of the guiding element 25 so that the tool may be rotated about the center thus determined to produce the annular cut 35. The radius of the annular cut 35 may, of course, be determined by the adjustment of the guide element 25, the rotative adjustment thereof being of particular utility in this respect.

In the embodiment illustrated in Figs. 5 and 6 of the drawings both the depth of the cut and the angle of the tool axis are determined by a single guiding member 37, and this guiding member is so constructed that it may be associated with the mounting lug 28 of the tool in much the same manner as the guiding element 25 of Fig. 1. Thus the guiding member 35 has a screw threaded mounting shank 26' which extends through the bore 27 in the lug 28 and is longitudinally adjustable therein by means of similar nuts 29 engaging opposite faces of the lug 28. The guiding member 37 engages the work surface on at least three sides of the cutting element 13 as indicated in Fig. 6 and thus determines the angle of the tool axis. In the form shown in Figs. 5 and 6 the guiding element 37 has a foot-like member 38 of U-shaped form, and the member 38 is connected to one end of the mounting shank 26' at the closed end of the U. The foot-like member 38 and the mounting shank 26' being rigidly related, the angle of the tool axis is fixed in this particular form of guiding means, while the depth of the cut may be varied through longitudinal adjustment of the mounting shank 26' with relation to the mounting lug 28.

In the form illustrated in Fig. 7 the tool is provided with a guiding means 40 which is particularly adapted for use in producing straight line cuts or grooves, such as the groove 41, although it is not limited to this particular use. This form of guiding means is also constructed so as to be useable with the guard sleeve and lug construction hereinbefore described. Thus the guiding member 40 has a straight threaded mounting shank 42 projecting through the lug 28 and longitudinally and rotatively adjustable through the use of similar clamping nuts 29. At one end the mounting shank 42 is bent laterally substantially at right angles to the mounting portion 42 so as to provide a lateral extending arm 43, while the arm 43 at its end is bent laterally as at 44 to provide a guiding portion extending parallel to but offset laterally from the mounting shank 42. On the end corner of the guiding portion 44 which is remote from the axis of the mounting shank 42 a notch 45 is provided so that its right angle surfaces may be engaged with the top and side edges of a guiding strip 46. This guiding strip may be of any desired form but as herein shown is in the form of a straightedge.

The guiding means illustrated in Fig. 7 may also be employed in cutting an annular groove in a material such as glass, such use of the device being illustrated in Figs. 8 and 9 of the drawings. This use is somewhat similar to that shown in Fig. 4 except that the brittle nature of the material such as glass makes it impossible to provide the necessary guiding or center hole in the work piece. Thus as shown in Fig. 9 a positioning member 50 is placed upon the surfaces of the glass panel 51, this positioning member 50 preferably being of a rigid material with a bottom surface or layer 52 of a material such as rubber fixed thereto adjacent to one end of the member 50 a center hole 53 is formed to receive the reduced end 45' of the guiding member 40. This reduced end 45' is formed by reason of notch 45, and one surface of the notch rests on top of the member 50 so as to provide a non-binding bearing relationship between the guiding element 40 and the member 50. In this use the rotative adjustment of the guiding element 40 in the lug 28 determines the radius of the annular cut 54. It will be noted that in this use an abrasive cutting element 13 is employed and the portable tool is so supported as to position the tool shank perpendicular with relation to the surface of the glass panel 51. After cutting the major portion of the annular groove 54, the member 50 may be adjusted or moved so as to permit completion of the annular groove.

In many uses of the present tool it is desirable to avoid scratching of the surface of the work piece and for this reason a guiding member 55 is illustrated in Fig. 10 which is generally similar to the guiding member 40 in form with the exception that its guiding portion 44' has a rounded end 56 rather than the notched end 45 of Fig. 7.

Fig. 11 illustrates the invention as embodied in a portable tool having a flexible shaft drive 15, so that the handle 10 may be of relatively small diameter. With this construction the same output shaft and chuck construction are used in association with a similar guard sleeve 20 secured in place within a mounting recess or flange 17'. Since the guard sleeve 20 is constructed the same as in the embodiment of Fig. 1, the various forms of guiding means illustrated in Figs. 1 to 10 may be employed with equal advantage on the tool of Fig. 11.

From the foregoing description it will be apparent that the present invention provides a portable power driven tool which is more readily and easily guided and controlled than prior tools, and with which a workman may readily attain the desired form and depth of the cut without danger of marring or otherwise spoiling the work piece.

It will also be evident that the present invention provides a tool which may be effectively guided and controlled in a wide variety of cutting operations, and that this end is attained by means which is simple and rugged in character.

I claim:

1. A portable tool of the character described having a handle adapted to be grasped by the workman to support and manipulate the tool, rotative driving means in said handle terminating in a drive shaft at one end of the handle, a cutting tool axially mounted on said drive shaft and having its operative cutting element located remotely with relation to said shaft, a guard sleeve surrounding said shaft and mounted on said handle, a guide ring mounted on said guard sleeve in a plane perpendicular to the axis of said sleeve and adapted to be rotatably adjusted about said sleeve, means for securing said ring in adjusted position, said ring having its outer edge surface helically formed so as to provide guiding surfaces at different radial distances from the axis of said sleeve, and guiding means secured to said guard sleeve and projecting therefrom to a point adjacent to but offset laterally from the cutting element of said cutting tool.

2. A tool for cutting operations upon the surface of a piece of work, including a handle, a cutting tool carried by the handle, means to operate the tool, means having connection with the handle and extending laterally thereof for engagement with the surface of the work being cut so as to hold the tool at an angle to such surface, and other means having connection with the handle and having a part engageable with the said same surface of the work whereby to cooperate with the first guiding means in supporting and guiding the tool over the said same surface of the work.

3. A tool in accordance with claim 2, wherein the first-named guiding means is adjustable so as to vary the angle of inclination of the axis of the tool relative to the said same surface of the work.

4. A tool in accordance with claim 2, wherein said part of the second-named guiding means which engages the surface of the work is angularly disposed with relation to the axis of the second-named guiding means, and wherein the latter is adjustable both longitudinally and laterally of the axis of the cutting tool whereby to vary the depths of the cut thereof.

5. A tool in accordance with claim 2, wherein the first-named guiding means includes a rotary member having an eccentric periphery and wherein there is means to hold the member in different positions.

6. A tool in accordance with claim 2, wherein the first-named guiding means is disposed rearwardly of the cutting end of the tool and the second-named guiding means is disposed to engage the said surface of the work forwardly of and to one side of the cutting end of the tool.

7. A tool for operating on the surface of a piece of work including a handle, a cutter carried by the handle, means to operate the cutter, a pair of spaced gauges, one of said gauges extending laterally of the handle and the other of said gauges extending forwardly of the handle and in advance of the cutter and each gauge having a part engageable upon the same surface of the work being cut and one of which holds the handle and thereby the tool at an angle to the said surface of the work, means to mount said gauges on the handle and to provide for movement of said one gauge with relation to said handle so as to occupy different positions whereby to vary the angularity of the tool to the said surface of the work, and means to releasably hold said one gauge in adjusted position.

8. A tool in accordance with claim 7, wherein the other gauge has the said part thereof which engages the work extending laterally thereof and wherein said other gauge has adjustable means thereon to provide for lateral and longitudinal movement thereof axially of the cutting tool.

ALBERT P. D. BELANGER.